(12) United States Patent
Bellar et al.

(10) Patent No.: US 11,860,605 B2
(45) Date of Patent: Jan. 2, 2024

(54) MOBILE ASSEMBLY APPARATUS

(71) Applicant: Walmart Apollo, LLC, Bentonville, AR (US)

(72) Inventors: Jason Bellar, Bella Vista, AR (US); Jeremy L. Velten, Bella Vista, AR (US); Amy Savaiinaea, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/575,455

(22) Filed: Jan. 13, 2022

(65) Prior Publication Data

US 2022/0137590 A1    May 5, 2022

Related U.S. Application Data

(63) Continuation of application No. 16/530,572, filed on Aug. 2, 2019, now abandoned.

(Continued)

(51) Int. Cl.
| | |
|---|---|
| *G05B 19/406* | (2006.01) |
| *G06F 16/903* | (2019.01) |
| *G05B 19/4155* | (2006.01) |

(52) U.S. Cl.
CPC ....... *G05B 19/406* (2013.01); *G05B 19/4155* (2013.01); *G06F 16/90335* (2019.01);
(Continued)

(58) Field of Classification Search
CPC .............. G05B 19/406; G05B 19/4155; G05B 2219/31031; G05B 2219/31061;
(Continued)

(56) References Cited

U.S. PATENT DOCUMENTS

| | | |
|---|---|---|
| 4,815,190 A | 3/1989 | Haba, Jr. |
| 5,971,512 A | 10/1999 | Swan |

(Continued)

FOREIGN PATENT DOCUMENTS

| | | |
|---|---|---|
| CN | 204054038 U | 12/2014 |
| CN | 105397817 A | 3/2016 |

(Continued)

OTHER PUBLICATIONS

International Search Report and Written Opinion for Application No. PCT/US2019/044912, dated Oct. 31, 2019, 8 pages.

(Continued)

*Primary Examiner* — Charles Cai
(74) *Attorney, Agent, or Firm* — Fitch, Even, Tabin & Flannery LLP

(57) ABSTRACT

A mobile assembly apparatus and a method of assembling a retail product utilizing a retail assembly are discussed. The mobile assembly apparatus may include a cabinet structure, an expandable work surface, a frame, wheels, an articulated arm, outrigger supports, a power supply, sensors, a hardware dispenser, and a computing device. The mobile assembly apparatus scans a machine readable identifier and retrieves assembly instructions for an item associated with the identifier. The computing device controls the outrigger supports and extendable surface based on the instructions. The computing device monitors the progress of the assembly of the time and validates the assembly based on assembly data from the sensors.

23 Claims, 6 Drawing Sheets

Related U.S. Application Data

(60) Provisional application No. 62/714,210, filed on Aug. 3, 2018.

(52) U.S. Cl.
CPC ............. *G05B 2219/31031* (2013.01); *G05B 2219/31061* (2013.01)

(58) Field of Classification Search
CPC ........... G05B 2219/40298; G05B 2219/40033; G06F 16/90335; Y02P 90/02; B25J 9/1687
See application file for complete search history.

(56) References Cited

U.S. PATENT DOCUMENTS

| | | | |
|---|---|---|---|
| 7,729,952 B1 * | 6/2010 | Kulesza | G06Q 30/00 705/26.5 |
| 7,782,607 B2 | 8/2010 | Harbin | |
| 8,084,992 B2 | 12/2011 | Scheffy | |
| 8,240,684 B2 | 8/2012 | Ross | |
| 9,128,481 B2 | 9/2015 | Wechter | |
| 9,329,594 B2 | 5/2016 | Rataul | |
| 9,370,142 B2 | 6/2016 | Barnhill | |
| 9,644,782 B2 | 3/2017 | Linson | |
| 9,626,714 B2 | 4/2017 | Boer | |
| 9,630,312 B2 | 4/2017 | Grela | |
| 9,789,572 B1 | 10/2017 | Cheung | |
| 9,815,155 B2 | 11/2017 | Lin | |
| 9,887,562 B2 | 2/2018 | Racenet | |
| 10,044,205 B1 * | 8/2018 | Voelz | H02J 7/0013 |
| 10,124,773 B1 | 11/2018 | Mourlam | |
| 2003/0163219 A1 | 8/2003 | Flesher | |
| 2004/0225390 A1 | 11/2004 | Keller | |
| 2009/0024240 A1 | 1/2009 | Clark | |
| 2009/0256682 A1 | 10/2009 | Tu | |
| 2010/0042445 A1 * | 2/2010 | Nicosia | G06Q 50/30 715/810 |
| 2010/0217437 A1 | 8/2010 | Sarh | |
| 2011/0270432 A1 | 11/2011 | Carpenter | |
| 2012/0053726 A1 | 3/2012 | Peters | |
| 2012/0308969 A1 | 12/2012 | Rataul | |
| 2012/0323362 A1 | 12/2012 | Paydar | |
| 2013/0103179 A1 | 4/2013 | Miyoshi | |
| 2015/0032252 A1 * | 1/2015 | Galluzzo | B60P 1/5423 700/218 |
| 2016/0104386 A1 | 4/2016 | Kruglick | |
| 2018/0181134 A1 | 6/2018 | Muck | |
| 2018/0214328 A1 * | 8/2018 | Cheek | A61G 7/1065 |
| 2018/0277015 A1 * | 9/2018 | Casella | G06K 9/62 |
| 2018/0345487 A1 * | 12/2018 | Sandhu | B25J 9/02 |
| 2018/0360077 A1 * | 12/2018 | Krebs | A23L 3/185 |
| 2019/0299536 A1 | 10/2019 | Putman | |
| 2020/0041977 A1 | 2/2020 | Bellar | |

FOREIGN PATENT DOCUMENTS

| | | |
|---|---|---|
| WO | 2009053432 | 4/2009 |
| WO | 2015037923 | 3/2015 |
| WO | 2015155701 A1 | 10/2015 |
| WO | 2020028807 | 2/2020 |

OTHER PUBLICATIONS

U.S. Appl. No. 16/530,572; Office Action dated Sep. 20, 2020; (pp. 1-28).

U.S. Appl. No. 16/530,572; Notice of Allowance dated Oct. 18, 2021; (pp. 1-10).

U.S. Appl. No. 16/530,572; Office Action dated Mar. 31, 2021; (pp. 1-25).

* cited by examiner

MOBILE ASSEMBLY APPARATUS

CROSS-REFERENCE TO RELATED PATENT APPLICATION

This application is a continuation application of U.S. patent application Ser. No. 16/530,572, filed on Aug. 2, 2019, which claims priority to, and the benefit of, U.S. Provisional Application No. 62/714,210, filed on Aug. 3, 2018, the contents of which are both hereby incorporated by reference in their entirety.

BACKGROUND

Assembly of unassembled items is frequently performed by an untrained assembler. The assembly process may follow written instructions that call for the use of particular tools. The assembly of the item may take place in a workspace set aside for item assembly.

SUMMARY

In one embodiment, a mobile assembly apparatus comprises a cabinet structure including a frame having an interior, an expandable work surface that is configured to extend and retract, and wheels disposed at distal corners of a bottom side of the cabinet structure. The mobile assembly apparatus further includes an articulated arm coupled to the cabinet structure and outrigger supports coupled to the frame disposed at distal corners of the frame, wherein the outrigger supports are configured to extend from the frame and retract to the frame, at least one controller controlling the positioning of the outrigger supports. The mobile assembly apparatus further includes a power supply coupled to the cabinet structure, sensors including at least one imaging device and at least one scanning device, and a hardware dispenser coupled to the cabinet structure and configured to store hardware containment pods corresponding to types of items. The mobile assembly apparatus further includes a computing device equipped with a processor and communicatively coupled to the at least one controller and the sensors and configured to execute an assembly validation module that when executed receives scan data from the scanning device from a scan of a machine-readable identifier associated with an item being assembled, identifies the item being assembled from among the items based on the scan data, receives assembly instructions for the identified item, sends instructions to the at least one controller to adjust a position of the outrigger supports based on the identification of the item, monitors progress of an assembly of the item using assembly data received from the sensors related to a step of assembly, and validates the assembly step based on the assembly data and the assembly instructions.

In another embodiment, a method of assembling a retail product utilizing a mobile assembly apparatus includes receiving scan data from a scanning device of a scan of a machine-readable identifier associated with an item being assembled, identifying an item being assembled from items based on the scan data, and receiving assembly instructions for the identified item. The method also includes sending instructions to at least one controller to adjust a position of a set of outrigger supports based on the identification of the item, sending instructions to the at least one controller to adjust a position of a set of an expandable work surface based on the identification of the item, and monitoring progress of an assembly of the item using assembly data received from the sensors related to a step of assembly. The method additionally includes validating the step of assembly based on the assembly data and the assembly instructions.

In another embodiment, a non-transitory machine-readable medium is provided that stores instructions executable by a processing device. Execution of the instructions causes the processing device to implement a method for assembling a retail product utilizing a retail assembly support device, having stored thereon, instructions that when executed in a computing system, cause the computing system to perform operations. The operations include receiving scan data from a scanning device of a scan of a machine-readable identifier associated with an item being assembled, identifying an item being assembled from a plurality of items based on the scan data, and receiving assembly instructions for the identified item. The operations further include sending instructions to at least one controller to adjust a position of a set of outrigger supports based on the identification of the item, sending instructions to the at least one controller to adjust a position of a set of an expandable work surface based on the identification of the item, and monitoring progress of an assembly of the item using assembly data received from the sensors related to a step of assembly. The operations additionally include validating the step of assembly based on the assembly data and the assembly instructions.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein.

DETAILED DESCRIPTION

Described in detail herein is a mobile assembly apparatus. In one embodiment, the mobile assembly apparatus provides support for the assembly of items, such as but not limited to, commonly purchased retail products. The mobile assembly apparatus provides a cabinet with wheels attached for mobility. The cabinet also includes an expandable assembly surface. The mobile assembly apparatus further includes an articulated arm for grasping partially assembled retail products. The mobile assembly apparatus includes outrigger supports to compensate for heavier retail products grasped by the articulated arm. A power supply also is included in the mobile assembly apparatus. The mobile assembly apparatus additionally includes sensors and a computing device. The sensors may be used to detect the retail product in various states of assembly. The computing device executes an assembly validation module that determines a correct or incorrect state of assembly based on information provided by the sensors. The assembly validation module alerts the assembler to miss-assembly or correct assembly and may provide additional instructions to complete assembly of the retail product.

Figure 1:
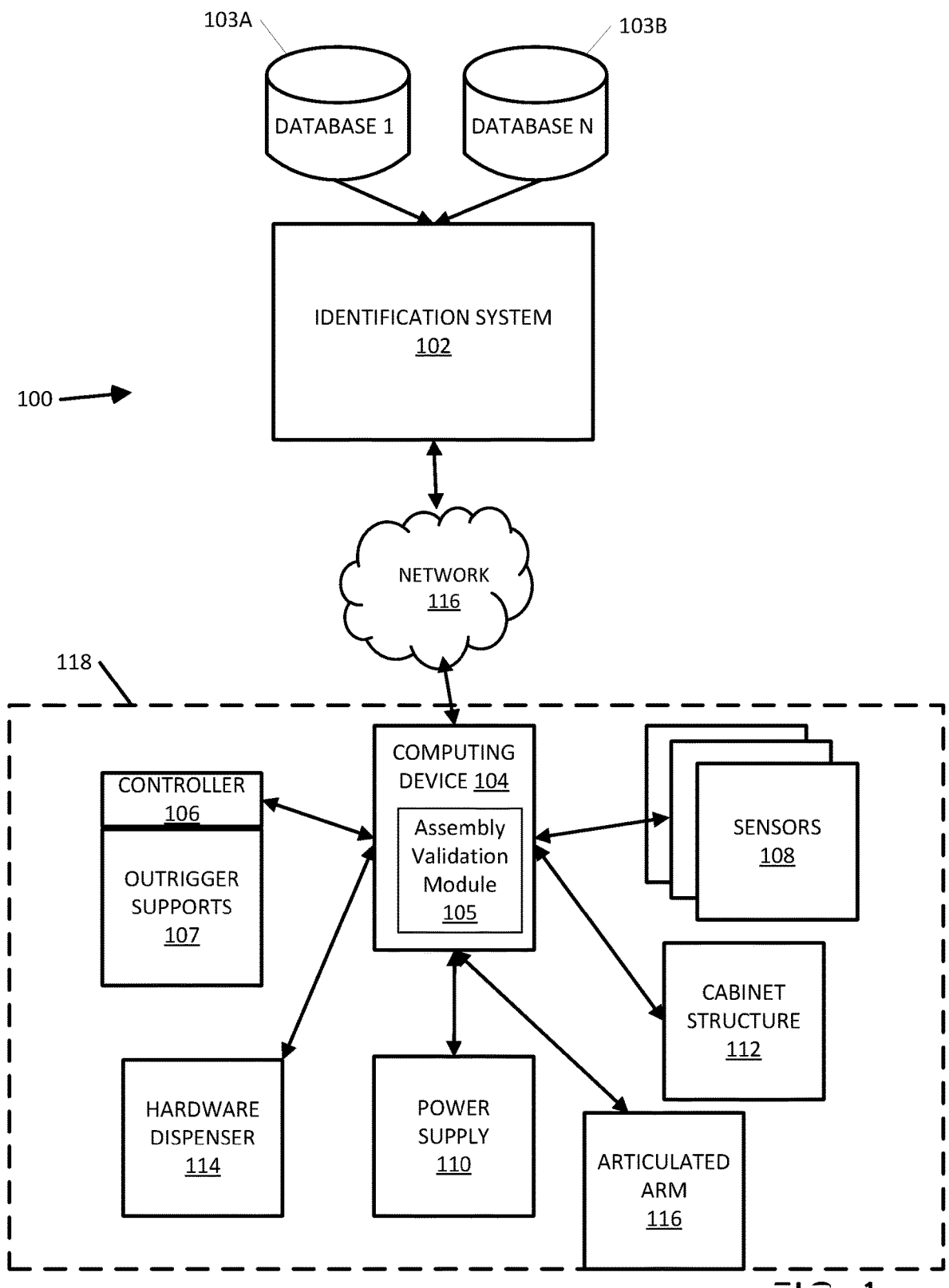
FIG. 1 is a block diagram illustrating a system supporting a mobile assembly apparatus according to an exemplary embodiment.

FIG. 1 is a block diagram illustrating a system 100 supporting a mobile assembly apparatus according to an exemplary embodiment. System 100 includes an item identification system 102 and one or more databases 103A, 103B communicatively connected via network 116 with mobile assembly apparatus 118. Mobile assembly apparatus 118 includes, a computing device 104, a controller 106 that controls positioning of outrigger supports 107, one or more sensors 108, a power supply 110, a hardware dispenser 114, a cabinet structure 112, and articulated arm 116.

The item identification system 102 provides a mechanism for the mobile assembly apparatus 118 to retrieve item information. For example, the item identification system 102 may provide a platform for interfacing with a mobile assembly apparatus 118 within a retail environment. The item identification system 102 provides support software and hardware for the operation of the mobile assembly apparatus. The item identification system 102 is configured to receive a machine readable identifier associated with an item read by a sensor on the mobile assembly apparatus 118, retrieve information from databases 103A,103B related to the item, and provide information relating to the associated item back to the submitting mobile assembly apparatus.

Mobile assembly apparatus 118 includes a computing device 104 equipped with a processor executing an assembly validation module 105 that communicates with the item identification system 102. The assembly validation module 105 receives a machine readable identifier associated with an item (read by one of the sensors 108), transmits the machine readable identifier to the item identification system 102, and receives information from the item identification system 102 regarding the item associated with the machine readable identifier in return. Computing device 104 and/or mobile assembly apparatus 118 may include various input and output methods for human interaction including but not limited to video displays, touchscreens, cameras, speakers, and microphones. The assembly validation module 105 may communicate, directly or indirectly with a controller 106 that controls positioning of outrigger supports 107, one or more sensors 108, a hardware dispenser 114 and an articulated arm 116. Computing device 104 and mobile assembly apparatus 118 are powered by a power supply 110.

The controller 106 includes a hardware and/or software solution for interfacing with various other components of the mobile assembly apparatus 118. The controller 106 is used at the direction of the assembly validation module 105 for extending and retracting the outrigger supports 107 used to stabilize mobile assembly apparatus 118 based on a size and/or weight of an item being assembled. The controller 106 may also adjust the position of outrigger supports by transmitting commands to extend and retract the supports based on the state of assembly of the item. Additionally, in one embodiment, the controller 106 may be used to automatically expand work surfaces of the mobile assembly apparatus 118 in response to command from assembly validation module 105.

One or more sensors 108 are communicatively coupled to the assembly validation module 105. The one or more sensors 108 provide inputs related to the identification of, and state of assembly of the item. The one or more sensors 108 include, but are not limited to, cameras, sensors capable of reading machine-readable identifiers, RFID and NFC readers, weight sensors, accelerometers, thermometers, and vibration sensors. The one or more sensors 108 provide input to the assembly validation module 105 used to determine the state of assembly of the item. For example, cameras provide images or video depicting the item in a state of assembly as input for the assembly validation module 105 to use in determining the state of assembly of the item.

The camera images may enable the assembly validation module 105 to recognize the individual parts based on their size, color and assembly markings (part b, part 1a, etc.). The parts may also employ digital watermarking such that, in one embodiment, is only visible to the camera. In one embodiment, the watermarking may have orientation markings to help assist identifying if the part was installed the right way, backwards, upside down or is an incorrect part.

Another sensor that may assist the assembly validation module 105 to detect the correctness of an assembly is a weight sensor. As more parts are added in sequence, the assembled item will get heavier. A check at the end of each step compared to a reference weight can determine if enough parts have been used and if the correct parts have been used. When a weight of the assembled item that is too heavy or too light, a wrong assembly is indicated. Another sensor that may aide the assembly validation module 105 to detect the correctness of an assembly is an ultrasound sensor. At the end of each step, ultrasound may be used to create a three dimensional representation of what has been assembled so far. After a check with a reference in the database, if there was deviation from the reference, then wrong assembly and/or wrong parts have been used. The ultrasound may also identify the remaining parts and if the wrong parts remain, a wrong assembly may be indicated.

A power supply 110 is included in the mobile assembly apparatus. The power supply 110 provides electrical power to electrical devices on the mobile assembly apparatus such as the computing device 104, the controller 106, the outrigger supports 107, the one or more sensors 108, the hardware dispenser 114 and the articulated arm 116. In one non-limiting example, the power supply 110 includes a rechargeable battery configured to provide electricity to the computing device, the sensors and electrical assembly tools. Alternatively, the power supply provides electrical power through a corded electrical interface designed to connect to standard power outlets. The power supply 110 provides support for converting the alternating current of a standard power outlet to the direct current utilized by electronic devices.

A hardware dispenser 114 may be coupled to the cabinet structure 112 and configured to store hardware components needed for the assembly of items. In one embodiment, cabinet structure 112 may include a frame having an interior, an expandable work surface that is configured to extend and retract, and wheels that are disposed at distal corners of a bottom side of the cabinet structure. The hardware dispenser 114 may be communicatively coupled to the computing device 104 and the assembly validation module 105. The hardware dispenser 114 stores hardware containment pods (packages) of commonly used hardware components utilized in assembling items. For example, if many items require a #8 screw for assembly, a pod containing #8 screws is inserted into the hardware dispenser 114. Based on the size of the pod inserted to the hardware dispenser 114, the hardware dispenser reports a number of that specific part inventoried in the hardware dispenser to the assembly validation module 105. The hardware dispenser 114 is configured to release assembly hardware corresponding to the hardware containment pods based on the received instructions from the assembly validation module 105. For example, if the item identified via a machine-readable identifier or other means is identified as a chair by the identification system 102, the instructions for the chair are retrieved by the identification system and forwarded to the assembly validation module 105. If a chair assembly requires four #8 screws, the assembly validation module 105 instructs the hardware dispenser 114 to release four #8 screws. The assembly validation module 105 instructs the hardware dispenser 114 to dispense all of the necessary hardware for a complete assembly of an item at once, or the assembly validation module 105 releases the hardware as a subset of assembly hardware based on the received instructions after a previous step of assembly of the item has been verified as completed by the assembly validation module 105.

A network 116 connects the item identification system 102 with the computing device 104 inclusive to the mobile assembly apparatus. The network 116 can be a local area network (LAN), a wide area network (WAN), or the internet. The network 116 facilitates communication between the devices utilizing common transport layer protocols such as transmission communication protocol (TCP) and user datagram protocol (UDP). The data utilized to support the mobile assembly apparatus is contained in the application layer portion of the network protocol stack.

The databases 103A, 103B hold indexed and retrievable data relating to the items that are to be assembled. The databases 103A, 103B are communicatively coupled with the item identification system 102 and are able to receive queries from the item identification system 102 for specific items. Upon a query by the item identification system 102, the databases 103A, 103B provide information relating to the item. For example, the query may be triggered by a scan of a machine-readable identifier associated with an item. The information includes descriptions, photographs, assembly instructions, and data used to verify the assembly of the item.

Figure 2A:
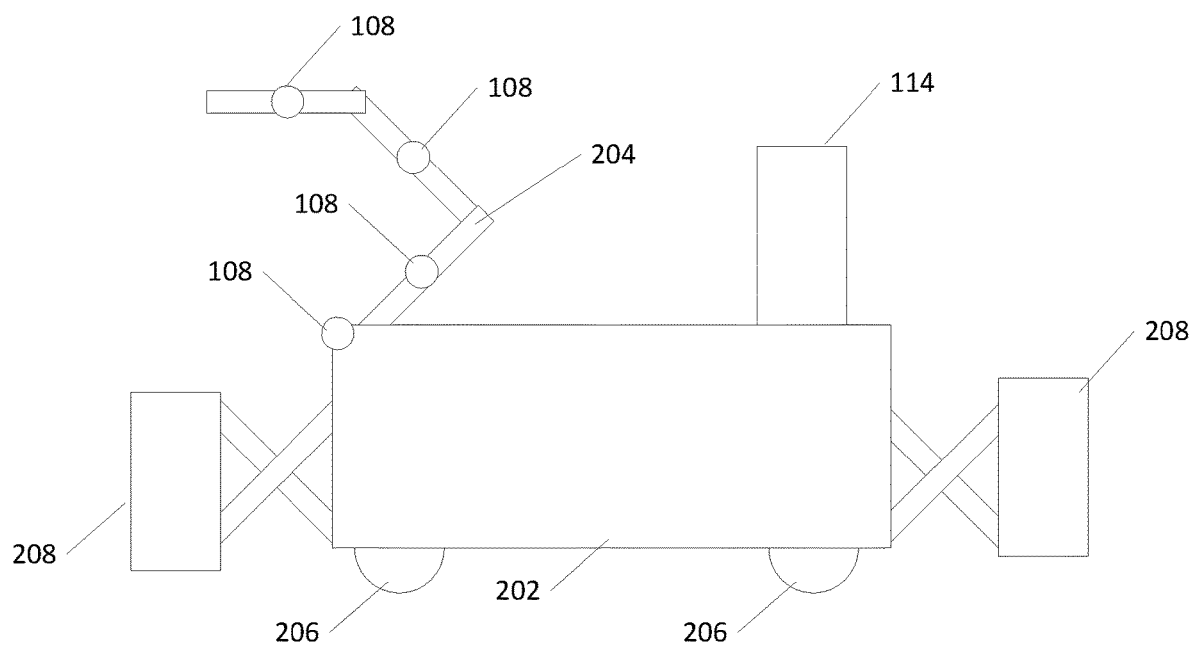
FIGS. 2A and 2B are diagrams illustrating mobile assembly apparatus according to an exemplary embodiment.
Figure 2B:
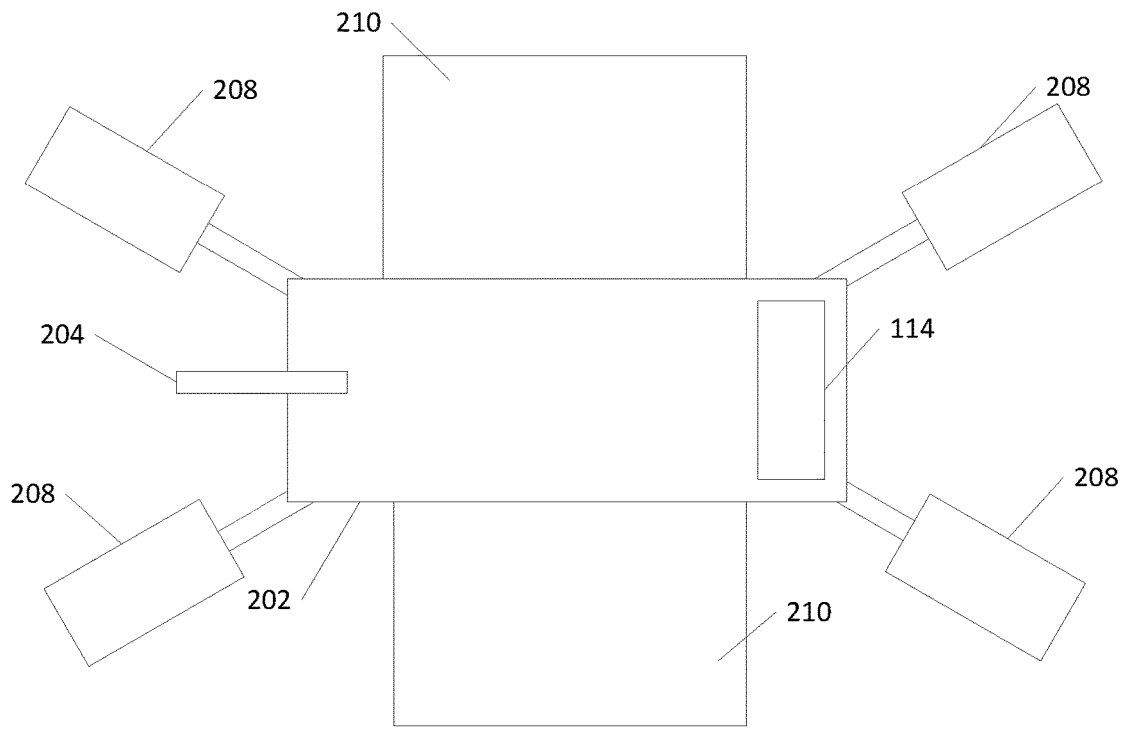

FIGS. 2A and 2B are a diagram illustrating mobile assembly apparatus according to an exemplary embodiment. The mobile assembly apparatus 118 includes a cabinet 202, an articulated arm 204, wheels 206, outrigger supports 208, and an extendable surface 210.

The cabinet 202 provides a frame or support structure for the other components of the mobile assembly apparatus 118. The frame of the cabinet 202 includes an interior space configured to hold tools related to the assembly of an item. Tools can include but are not limited to screwdrivers, wrenches, power tools (e.g. drills, saws), and air compressors. The cabinet 202 may include discrete drawers internal to the cabinet for the storage of the tools.

An articulated arm 204 is coupled to the top of the cabinet. The articulated arm 204 includes one or more joints, allowing positioning of the arm to accommodate the assembly of items of different sizes and shapes. The joints are able to be individually manipulated to change the positioning of the articulated arm 204. The joints include locking mechanisms to hold the articulated arm 204 in a desired position. The articulated arm 204 is configured to include a vice, claw, or similar grasping device to hold the item during assembly. In one embodiment the articulated arm may be manually adjusted. In another embodiment, the articulated arm may controlled by the controller pursuant to direction by the assembly validation module. A set of wheels 206 are affixed to the bottom of the cabinet 202. The set of wheels 206 may be installed at distal corners of the bottom of the cabinet to provide stability during transport of the mobile assembly apparatus 118. Each of the wheels 206 includes locking mechanisms to secure the mobile assembly apparatus 118 in one location during the assembly of an item.

A set of outrigger supports 208 are coupled to the frame and disposed at distal corners of the frame. The outrigger supports are configured to extend from the frame and retract to the frame. The set of outrigger supports 208 are configured to extend and retract from the cabinet 202. As an assembler of the item progresses in assembly, the set of outrigger supports 208 extend and retract independently from one another to compensate for the weight associated from any item grasped by the articulated arm 204. In one embodiment the outrigger supports may be manually adjusted. In another embodiment, the outrigger supports may controlled by the controller pursuant to direction by the assembly validation module.

An extendable surface 210 may be coupled to the top surface of the cabinet 202. The extendable surface 210 is configured to extend or retract onto the surface of the cabinet 202 in a compact position. The compact position is utilized during transport of the mobile assembly apparatus 118 as well as when assembling smaller items. The extendable surface 210 is actuated to fold open from the sides of the cabinet 202, to provide a larger work surface for the assembly of larger items. The extendable surface 210 may be configured to fold open from one or more sides of the cabinet 202. In one embodiment the extendable surface may be manually adjusted. In another embodiment, the extendable surface may controlled by the controller pursuant to direction by the assembly validation module.

Figure 3:
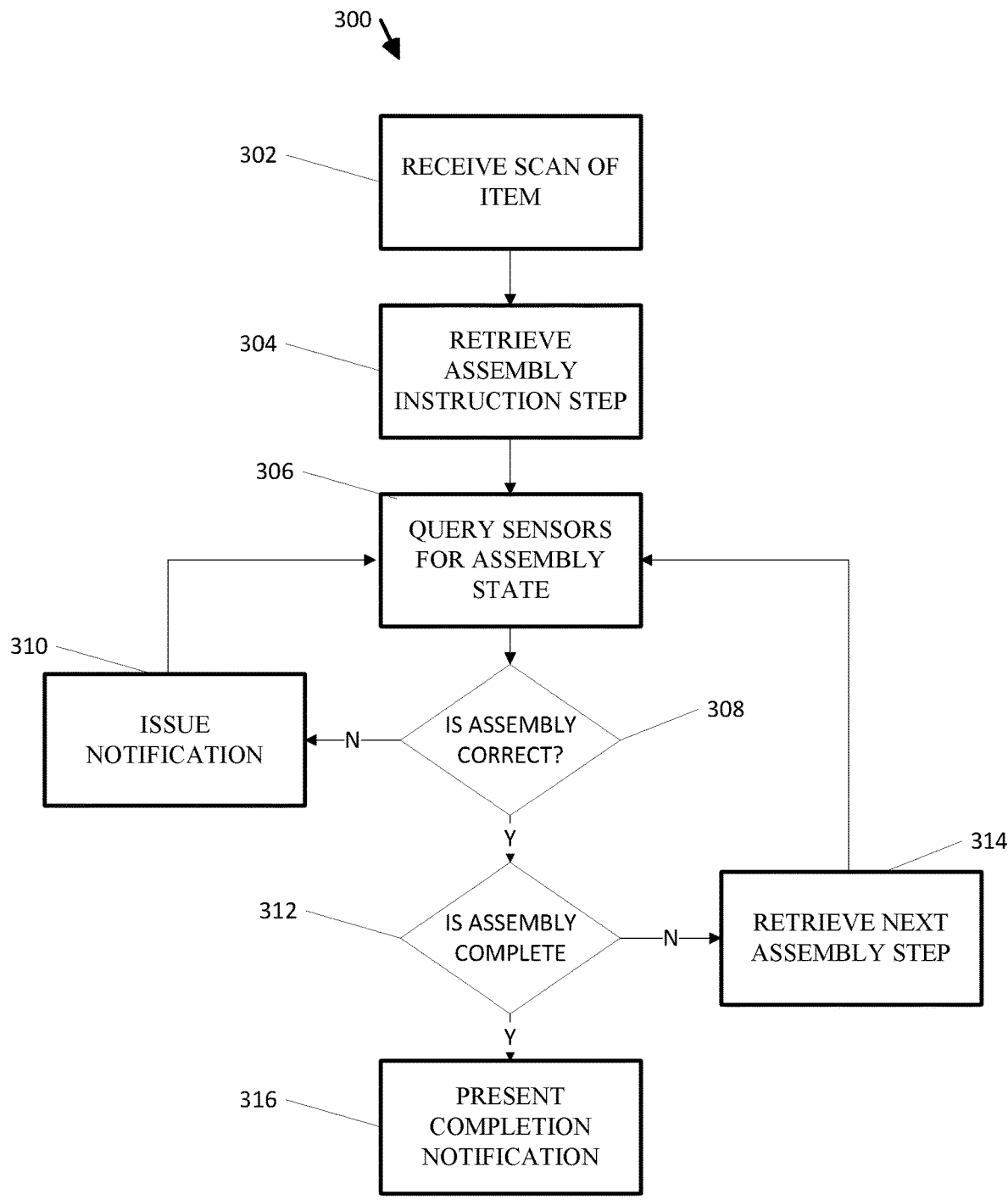
FIG. 3 is a flow diagram illustrating a process of assembling an item on a mobile assembly apparatus according to an exemplary embodiment.

FIG. 3 is a flow diagram 300 illustrating a process of assembling an item on a mobile assembly apparatus according to an exemplary embodiment. The flow diagram 300 presents a typical use case for the assembly of an item on the mobile assembly apparatus 118 according to one embodiment.

At step 302, the assembly validation module 105 receives a scan of an item. The scan is of a machine readable identifier such as, but not limited to, a barcode, Universal Product Code (UPC), or a quick response (QR) code. Alternatively, the scan is a scan of a near field communication (NFC) technology such as a radio frequency identifier (RFID) tag. The scan is read through the set of sensors 108. The set of sensors 108 may include an NFC transceiver and a RFID reader. The machine readable identifier is affixed to or printed on the packaging of the item to be assembled and associates the machine readable identifier with the item. The scanned machine readable identifier is transmitted to the item identification system 102. In one embodiment the machine-readable identifier is transmitted to the identification system using an application programming interface (API). Upon receipt of the machined readable identifier, the item identification system 102 accesses the databases 103A, 103B to retrieve information related to the item associated with the machine readable identifier. The item identification system 102 transmits the retrieved information including assembly instructions to the assembly validation module 105.

At step 304, the assembly validation module 105 retrieves an assembly instruction step from the received information. The assembly validation module 105 decodes the retrieved information. The retrieved information includes but is not limited to descriptions, photos, assembly instruction steps, and assembly verification data. The descriptions may include descriptions of the manufacturer of the retail item, the item's purpose, and photos of the item. Assembly instruction steps may include photographs, graphical animations, mobile assembly apparatus configuration data (e.g. outrigger support control information), workspace configuration information and written instructions on how to assemble the item. The assembly verification data may include, but is not limited to, imaging and weight data for comparison. The assembly validation module 105 retrieves a current assembly instruction step, and presents the assembly instruction step visually or audibly through a display surface or speaker integrated into, or otherwise accessible to the mobile assembly apparatus 118. The assembler may then follow the instruction step.

At step 306, the assembly validation module 105 queries sensors to determine assembly state. The sensors may provide imaging data and/or weight data corresponding to the partially assembled item.

At step 308, the assembly validation module 105 determines whether the assembly is correct. The assembly validation module 105 utilizes the assembly verification data in conjunction with the imaging data and weight data from the sensors to determine whether the item was assembled correctly. The assembly validation module 105 compares images in the assembly verification data against the imaging data to determine whether any differences between the images of the assembled item deviate within an acceptable threshold. Additionally the assembly validation module 105 may compares weight data within the verification data to the weight data corresponding to the partially assembled item to determine whether any differences between the weights of the assembled item deviate within an acceptable threshold.

At step 310, the assembly validation module 105 issues a notification that the assembly was incorrect, when any deviation is outside an acceptable threshold. The notification is a visual notification such as an icon or image rendered on a display of the assembly validation module 105. Alternatively, the notification is an auditory notification indicating a misassembled item.

At step 312, if this step was validated as correct, the assembly validation module 105 determines whether the assembly is complete. The assembly validation module 105 determines whether there are remaining steps for assembly from the retrieved information related to the item.

At step 314, when the assembly is not complete, the assembly validation module 105 retrieves the next assembly step and display and iterates over the remaining assembly steps.

At step 316, when the assembly is complete, the assembly validation module 105 presents a notification upon completion of the assembly of the item. Additionally the assembly validation module 105 notifies the item identification system 102 of the complete assembly. The item identification system 102 may update the databases 103A, 103B utilizing the machine readable identifier to update a record indicating that the item has been successfully assembled at the mobile assembly apparatus 118.

Figure 4:
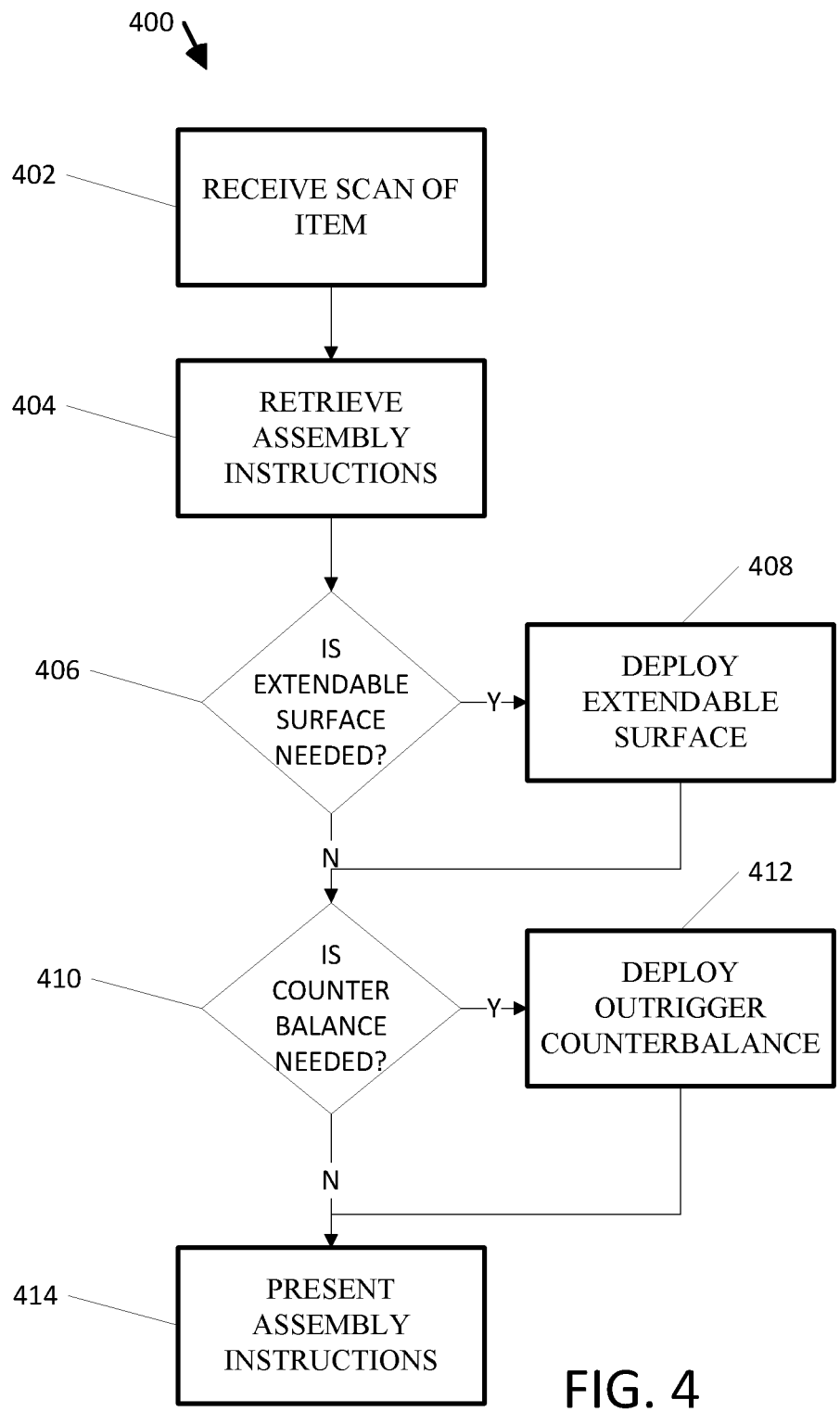
FIG. 4 is a flow diagram illustrating a process of assembling an item on a mobile assembly apparatus according to an exemplary embodiment.

FIG. 4 is a flow diagram 400 illustrating a process of assembling an item on a mobile assembly apparatus according to an exemplary embodiment. The flow diagram 400 demonstrates a process of dynamically preparing the mobile assembly apparatus 118 for the assembly of an item.

As described above at step 302, the assembly validation module 105, receives a scan of item at step 402. Additionally as described above at step 304, at step 404 the assembly validation module 105 retrieves assembly instructions. The assembly validation module 105 may parse the mobile assembly apparatus configuration data from the assembly instructions into steps. The mobile assembly apparatus configuration data may include dimension of the fully assembled item which can be compared to the dimensions of the fully assembled item against the assembly area of the mobile assembly apparatus 118. Additionally, the assembly instructions may also include information indicating the size of the workspace surface needed for assembly.

At step 406, the assembly validation module 105 determines whether an extended surface is necessary for assembly of the item. The assembly validation module 105 utilizes the dimensions of the item compared against the size of the extendable surface, or alternatively the assembly validation module may utilize the information already determined that the item requires a full or partially extended surface for assembly.

At step 408, following a determination of need, the assembly validation module 105 may send instructions to the controller to deploy an extendable surface. The assembly validation module 105 instructs the controller 106 to activate electro-mechanical devices including but not limited to motors to extend the extendable surface. Alternatively, the assembly validation module may issue a visual or audible notification to the assembler to extend the surface manually.

At step 410, the assembly validation module 105 determines whether a counterbalance is needed to support the mobile apparatus requiring a repositioning of the outrigger supports. The assembly validation module 105 utilizes the dimensions (e.g. weight) of the item as applied to the articulated arm 204 compared against the weight and center of gravity of the mobile assembly apparatus. If the weight of the item would cause the center of gravity of the mobile assembly apparatus to shift thereby causing the mobile assembly apparatus 118 to become unstable, then the assembly validation module 105 may transmit instructions to the controller to reposition the outrigger supports to move to another location to provide more stability. The assembly validation module 105 instructs the controller 106 to activate electro-mechanical devices including but not limited to motors to extend one or more outrigger supports to shift the center of gravity of the mobile assembly apparatus plus the item to a stable point. Alternatively, the assembly validation module may issue a visual or audible notification to the assembler to extend the outrigger supports manually.

At step 412, the one or more outrigger supports are deployed to provide a counterbalance.

At step 414, the assembly validation module 105 presents assembly instructions to the assembler. The assembly validation module 105 present assembly instructions through a display device, through auditory prompts, or through video projections.

Figure 5:
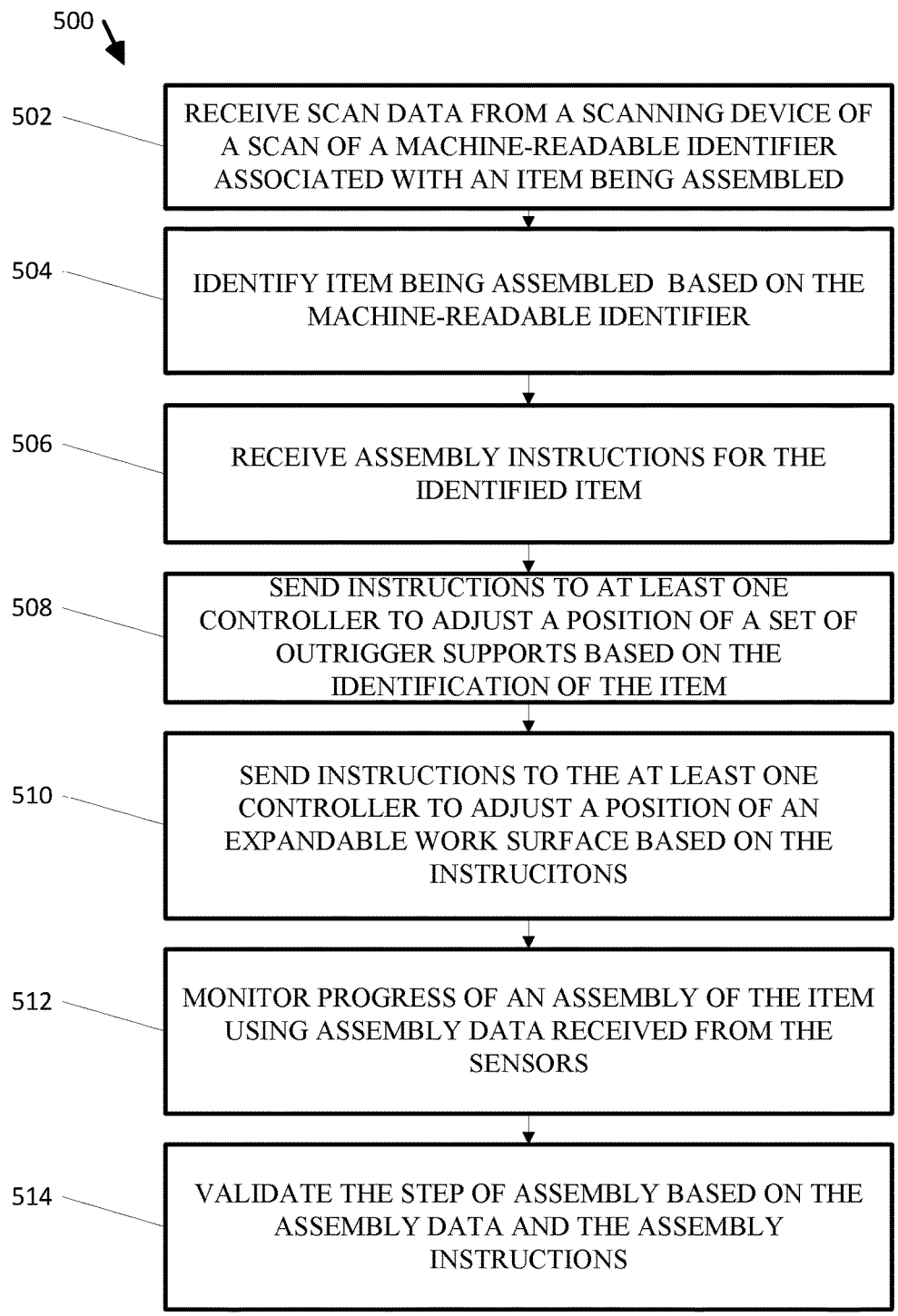
FIG. 5 is a flow diagram illustrating a process of assembling an item on a mobile assembly apparatus according to an exemplary embodiment.

FIG. 5 is a flow diagram 500 illustrating a process of assembling an item on a mobile assembly apparatus according to an exemplary embodiment.

At step 502, the assembly validation module 105 receives scan data from a sensor of a machine-readable identifier associated with an item being assembled.

As step 504, the data is sent to the item identification system as discussed above, so the item can be identified. For example, the identity of an item to be assembled may be determined based on indexing the scan data into a database.

At step 506, the assembly validation module 105 receives assembly instructions for the identified item from the item identification system. Based on the indexing or querying, the assembly instructions for the identified item may be retrieved from a database. The instructions may include auditory or visual instructions on how to assemble pieces or sub-assemblies of the item.

At step 508, the assembly validation module 105 sends instructions to at least one controller to adjust a position of a set of outrigger supports based on the identification of the item. Upon retrieving the assembly instructions for the item, a controller may be activated to extend one or more outrigger supports from the frame of the mobile assembly apparatus. As described above, the determination may be embedded in the instructions explicitly, or alternatively, a computing device may determine a set of outrigger supports to extend based on the product dimensions and the center of gravity of the mobile assembly apparatus.

At step 510, the assembly validation module 105 sends instructions to at least one controller to adjust a position of an expandable work surface based on the identification of the item. As described above, the controller adjusts the expandable work surface based on the dimensions of the item, or alternatively, based on the instructions themselves.

At step 512, the assembly validation module 105 monitors progress of an assembly of the item using assembly data received from the sensors related to a step of assembly. The assembly validation module may monitor progress of the assembly by taking sensor readings including imaging and weight readings. The computing device scans intermediate states of assembly of the item. The assembly validation module 105 determines a subset of assembly hardware required to complete a next step of assembly. The assembly validation module 105 transmits instructions to dispense, from the hardware dispenser 114, the subset of assembly hardware needed for the next assembly step. The assembly validation module 105 may inventory the hardware within the hardware dispenser. The assembly validation module 105 may also compare the number of hardware components required to assemble an item, and the number of components within the hardware dispenser. The assembly validation module 105 may present a notification indicating insufficient hardware to complete assembly of the item when such a condition is noted.

At step 514, the assembly validation module 105 validates the step of assembly based on the assembly data and the assembly instructions. The assembly validation module 105 compares the current state of assembly of the item to a reference state of the identified item contained in the verification data. The imaging and weight readings for the assembly step are compared against known values in the verification data. If any discrepancies in the comparison result in a deviance lower than a threshold, the step of assembly is validated. The assembly validation module 105 may present a notification indicating a delta relative to the deviation threshold.

Figure 6:
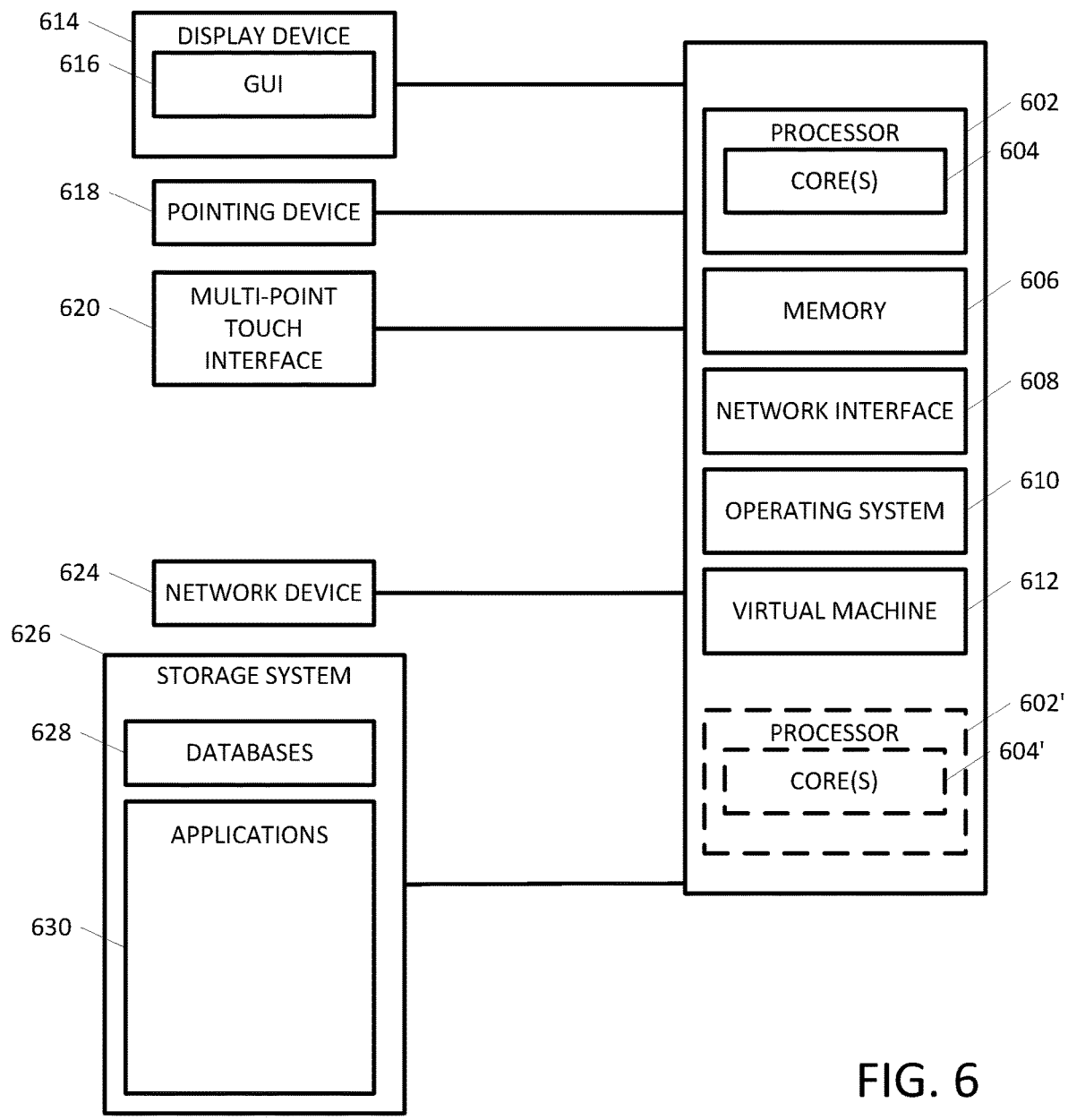
FIG. 6 depicts a block diagram an exemplary computing device in accordance with an exemplary embodiment.

FIG. 6 is a block diagram of an example computing device for implementing exemplary embodiments of the present disclosure. Embodiments of the computing device 600 can implement embodiments of the mobile assembly apparatus. For example, the computing device 600 can be embodied as the computing device 104 or the item identification system 102. The computing device 600 includes one or more non-transitory computer-readable media for storing one or more computer-executable instructions or software for implementing exemplary embodiments. The non-transitory computer-readable media include, but are not limited to, one or more types of hardware memory, non-transitory tangible media (for example, one or more magnetic storage disks, one or more optical disks, one or more flash drives, one or more solid state disks), and the like. For example, memory 606 included in the computing device 600 store computer-readable and computer-executable instructions or software for implementing exemplary operations of the computing device 600. The computing device 600 also includes configurable and/or programmable processor 602 and associated core(s) 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for implementing exemplary embodiments of the present disclosure. Processor 602 and processor(s) 602' each be a single core processor or multiple core (604 and 604') processor. Either or both of processor 602 and processor(s) 602' are configured to execute one or more of the instructions described in connection with computing device 600.

Virtualization is employed in the computing device 600 so that infrastructure and resources in the computing device 600 can be shared dynamically. A virtual machine 612 is provided to handle a process running on multiple processors so that the process appears to be using only one computing resource rather than multiple computing resources. Multiple virtual machines also are used with one processor.

Memory 606 includes a computer system memory or random access memory, such as DRAM, SRAM, EDO RAM, and the like. Memory 606 include other types of memory as well, or combinations thereof. The computing device 600 can receive data from input/output devices. A user interact with the computing device 600 through a visual display device 614, such as a computer monitor, which display one or more graphical user interfaces 616, multi touch interface 620 and a pointing device 618.

The computing device 600 also includes one or more storage devices 626, such as a hard-drive, CD-ROM, or other computer readable media, for storing data and computer-readable instructions and/or software that implement exemplary embodiments of the present disclosure. For example, exemplary storage device 626 can include one or more applications 630 and one or more databases 628 for storing information relating to items and assembly instructions. The databases 628 are updated manually or automatically at any suitable time to add, delete, and/or update one or more data items in the databases.

The computing device 600 can include a network interface 608 configured to interface via one or more network devices 624 with one or more networks, for example, Local Area Network (LAN), Wide Area Network (WAN) or the Internet through a variety of connections including, but not limited to, standard telephone lines, LAN or WAN links (for example, 802.11, Ti, T3, 56 kb, X.25), broadband connections (for example, ISDN, Frame Relay, ATM), wireless connections, controller area network (CAN), or some combination of any or all of the above. In exemplary embodiments, the computing system can include one or more antennas 622 to facilitate wireless communication (e.g., via the network interface) between the computing device 600 and a network and/or between the computing device 600 and other computing devices. The network interface 608 include a built-in network adapter, network interface card, PCMCIA network card, card bus network adapter, wireless network adapter, USB network adapter, modem or any other device suitable for interfacing the computing device 600 to any type of network capable of communication and performing the operations described herein.

The computing device 600 run any operating system 610, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 600 and performing the operations described herein. In exemplary embodiments, the operating system 610 is run in native mode or emulated mode. In an exemplary embodiment, the operating system 610 is run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components, or steps can be replaced with a single element, component, or step. Likewise, a single element, component, or step can be replaced with multiple elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further, still, other aspects, functions, and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts and that the steps in the exemplary flowcharts can be performed in a different order than the order shown in the illustrative flowcharts.

What is claimed is:

1. A mobile assembly apparatus comprising:
   a cabinet structure including:
      a frame having an interior,
      a work surface that is configured to support assembly of items thereon, and
      a plurality of wheels disposed at a bottom side of the cabinet structure;
   a power supply coupled to the cabinet structure;
   a plurality of sensors including at least one imaging device and at least one scanning device;
   a hardware dispenser coupled to the cabinet structure and configured to store a plurality of hardware containment pods with hardware for assembly of a plurality of items suitable for assembly at the cabinet structure, each of the plurality of items being assembled with hardware from the hardware dispenser from unassembled component parts to form an assembled item constituting a retail product; and
   a computing device equipped with a processor and communicatively coupled to the plurality of sensors and configured to execute an assembly validation module that when executed,
      receives scan data from the scanning device from a scan of a machine-readable identifier associated with an item being assembled,
      identifies the item being assembled from among the plurality of items based on the scan data,
      receives assembly instructions for the identified item to form an assembled item from its unassembled component parts,
      instructs the hardware dispenser to dispense assembly hardware based on the assembly instructions for the identified item,
      monitors progress of an assembly of the item using assembly data received from the at least one imaging device related to a step of assembly, and
      validates the assembly step based on the assembly data and the assembly instructions.

2. The apparatus of claim 1, further comprising an articulated arm coupled to the cabinet structure and configured for grasping partially assembled items.

3. The apparatus of claim 1, further comprising:
   a plurality of outrigger supports coupled to the frame disposed at distal corners of the frame, wherein the outrigger supports are configured to extend from the frame and retract to the frame, at least one controller controlling positioning of the outrigger supports;
   wherein the computing device is configured to send instructions to the at least one controller to adjust a position of the outrigger supports based on the identification of the item.

4. The apparatus of claim 1, wherein the hardware dispenser is configured to release assembly hardware corresponding to a hardware containment pod corresponding to the identified item upon a receipt of instructions from the computing device.

5. The apparatus of claim 1, wherein the hardware dispenser is configured to release a subset of assembly hardware upon receipt of instructions from the computing device based on an input from the plurality of sensors.

6. The apparatus of claim 1, wherein the computing device is configured to provide at least one of an auditory or visual notification of an improper assembly of the identified item.

7. The apparatus of claim 3, wherein the outrigger supports are configured to further extend based at least in part on a weight of a product part for the identified item grasped by an articulated arm.

8. The apparatus of claim 1, wherein the power supply comprises a rechargeable battery configured to provide electricity to the computing device, the plurality of sensors and a plurality of electrical assembly tools.

9. The apparatus of claim 1 wherein the mobile assembly apparatus further includes a compressor.

10. A method of assembling a retail product utilizing a mobile assembly apparatus comprising:
   providing a cabinet structure comprising a work surface, a power supply, and a plurality of wheels;
   by a hardware dispenser coupled to the cabinet structure, storing a plurality of hardware containment pods with hardware for assembly of a plurality of items, each of the plurality of items being assembled with hardware from the hardware dispenser from unassembled component parts to form an assembled item constituting a retail product; and
   by a computing device:
      receiving scan data from a scanning device of a scan of a machine-readable identifier associated with an item being assembled,
      identifying an item being assembled from the plurality of items based on the scan data,
      receiving assembly instructions for the identified item to form an assembled item from its unassembled component parts,
      instructing the hardware dispenser to dispense assembly hardware based on the assembly instructions for the identified item, monitoring progress of an assembly of the item using assembly data received from at least one imaging device related to a step of assembly, and validating the step of assembly based on the assembly data and the assembly instructions.

11. The method of claim 10, further comprising:

by an articulated arm coupled to the cabinet structure, grasping partially assembled items.

12. The method of claim 11, wherein the cabinet structure comprises a set of outrigger supports, the method further comprising:

by the computing device, sending instructions to at least one controller to adjust a position of the set of outrigger supports based on the identification of the item.

13. The method of claim 10, further comprising:

imaging, by an imaging device, an intermediate state of assembly of the identified item, determining a subset of assembly hardware required to complete a next step of assembly of the identified item, dispensing, by the hardware dispenser, the subset of assembly hardware required, imaging, by the imaging device, a next intermediate state of assembly of the identified item, comparing, by the computing device, the next intermediate state of assembly of the identified item to a reference state of the identified item, and presenting, by the computing device, a notification indicative of a delta relative to a threshold of deviation based on the comparing of the next intermediate state of assembly to the reference state.

14. The method of claim 12, wherein adjusting a position of the set of outrigger supports comprises:

receiving a weight of the identified item based on the scan data, determining a center of gravity based on the weight and a location of the articulated arm disposed on the mobile assembly apparatus, and extending a subset of the set of outrigger supports on a distal side of the mobile assembly apparatus from the location of the articulated arm based on the determined center of gravity.

15. The method of claim 13, wherein dispensing the subset of assembly hardware required comprises:

querying a database of retail products for assembly information based on the scan data, identifying the subset of assembly hardware required to assemble the identified item to the next intermediate state of assembly; and releasing the subset of assembly hardware from the hardware dispenser.

16. The method of claim 13, wherein the determining a subset of assembly hardware required further comprises:

identifying a number of hardware components associated with an assembly of the identified item, determining an amount of the hardware components within the hardware dispenser, comparing the number of hardware components against the amount of hardware components within the hardware dispenser; and presenting, by the computing device responsive to the comparing, a second notification indicative of a deficiency of the number of hardware components.

17. A non-transitory computer readable medium for assembling a retail product utilizing a retail assembly support device, having stored thereon, instructions that when executed in a computing device, cause the computing device to perform operations comprising:

receiving scan data from a scanning device of a scan of a machine-readable identifier associated with an item being assembled, identifying an item being assembled from a plurality of items based on the scan data, receiving assembly instructions for the identified item to form an assembled item from its unassembled component parts at a cabinet structure comprising a work surface, a power supply and a plurality of wheels, dispensing hardware, by a hardware dispenser configured to store a plurality of hardware containment pods with hardware for assembly of the plurality of items, each of the plurality of items being assembled with hardware from the hardware dispenser from unassembled component parts to form an assembled item constituting a retail product, instructing the hardware dispenser to dispense assembly hardware based on the assembly instructions for the identified item, monitoring progress of an assembly of the item using assembly data received from at least one imaging device related to a step of assembly, and validating the step of assembly based on the assembly data and the assembly instructions.

18. The medium of claim 17, the instructions further comprising:

grasping partially assembled items by an articulated arm coupled to the cabinet structure.

19. The medium of claim 18, wherein the cabinet structure comprises a set of outrigger supports, the instructions further comprising:

sending instructions to at least one controller to adjust a position of the set of outrigger supports based on the identification of the item.

20. The medium of claim 17, the instructions further comprising:

imaging, by an imaging device, an intermediate state of assembly of the identified item, determining a subset of assembly hardware required to complete a next step of assembly of the identified item, dispensing, by the hardware dispenser, the subset of assembly hardware required, imaging, by the imaging device, a next intermediate state of assembly of the identified item, comparing, by the computing device, the next intermediate state of assembly of the identified item to a reference state of the identified item, and presenting, by the computing device, a notification indicative of a delta relative to a threshold of deviation based on the comparing of the next intermediate state of assembly to the reference state.

21. The medium of claim 19, wherein the instructions for adjusting a position of the set of outrigger supports comprise:

receiving a weight of the identified item based on the scan data, determining a center of gravity based on the weight and a location of the articulated arm disposed on the retail assembly support device, and extending a subset of the set of outrigger supports on a distal side of the retail assembly support device from the location of the articulated arm based on the determined center of gravity.

22. The medium of claim 20, wherein the instructions for dispensing the subset of assembly hardware required comprise:

querying a database of retail products for assembly information based on the scan data, identifying the subset of assembly hardware required to assemble the identified item to the next intermediate state of assembly; and releasing the subset of assembly hardware from the hardware dispenser.

23. The medium of claim 20, wherein the instructions for determining a subset of assembly hardware required further comprise:

identifying a number of hardware components associated with an assembly of the identified item, determining an amount of the hardware components within the hardware dispenser, comparing the number of hardware components against the amount of hardware components within the hardware dispenser; and presenting, by the computing device responsive to the comparing, a second notification indicative of a deficiency of the number of hardware components.

* * * * *